(12) United States Patent
Zhang et al.

(10) Patent No.: US 11,709,894 B2
(45) Date of Patent: Jul. 25, 2023

(54) TASK PROCESSING METHOD AND DISTRIBUTED COMPUTING FRAMEWORK

(71) Applicant: BEIJING BAIDU NETCOM SCIENCE AND TECHNOLOGY CO., LTD., Beijing (CN)

(72) Inventors: Yuncong Zhang, Beijing (CN); Xiang Wen, Beijing (CN); Hua Chai, Beijing (CN); Cong Wang, Beijing (CN); Guanyin Zhu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 257 days.

(21) Appl. No.: 16/352,678

(22) Filed: Mar. 13, 2019

(65) Prior Publication Data

US 2019/0213217 A1    Jul. 11, 2019

Related U.S. Application Data (63) Continuation of application No. PCT/CN2016/102124, filed on Oct. 14, 2016.

(30) Foreign Application Priority Data

Sep. 30, 2016 (CN) .......................... 201610873646.X (51) Int. Cl.
*G06F 16/903* (2019.01)
*G06F 16/2455* (2019.01)
(Continued)

(52) U.S. Cl.
CPC ...... *G06F 16/90335* (2019.01); *G06F 16/182* (2019.01); *G06F 16/24524* (2019.01);
(Continued)

(58) Field of Classification Search
None
See application file for complete search history.

(56) References Cited

U.S. PATENT DOCUMENTS 9,715,496 B1 * 7/2017 Sapoznik ................ G10L 15/26
2011/0093491 A1   4/2011 Zabback et al.
(Continued)

FOREIGN PATENT DOCUMENTS

CN    101820444 A    9/2010
CN    101853179 A    10/2010
(Continued)

OTHER PUBLICATIONS

International Search Report dated May 2, 2017 for International Application No. PCT/CN2016/102124, 5 pages.
(Continued)

*Primary Examiner* — Kris E Mackes
*Assistant Examiner* — Soheila (Gina) Davanlou
(74) *Attorney, Agent, or Firm* — Knobbe, Martens, Olson & Bear LLP (57) ABSTRACT

The present disclosure discloses a task processing method and a distributed computing framework. A specific embodiment of the method includes: parsing an expression corresponding to a distributed computing task, and constructing task description information corresponding to the distributed computing task, the task description information being used to describe a corresponding relationship between an operator and a distributed dataset, and the operator acting on at least one of the distributed dataset or distributed datasets obtained by grouping the distributed dataset; determining, based on the task description information, a distributed dataset the operator acting on; and performing distributed computing on the distributed dataset the operator acting on using the operator. In the distributed computing, the acting scope and
(Continued)

nesting relationship of the operator is described by constructing a topology.

12 Claims, 5 Drawing Sheets

(51) Int. Cl.
*G06F 16/2452* (2019.01)
*G06F 40/205* (2020.01)
*G06F 16/182* (2019.01)
*G06F 16/9032* (2019.01)
*G06F 16/9035* (2019.01)
*G06F 16/901* (2019.01)
*G06F 9/50* (2006.01)

(52) U.S. Cl.
CPC .... *G06F 16/24556* (2019.01); *G06F 16/9027* (2019.01); *G06F 16/9035* (2019.01); *G06F 16/90332* (2019.01); *G06F 40/205* (2020.01); *G06F 9/5072* (2013.01)

(56) References Cited

U.S. PATENT DOCUMENTS

| 2014/0019437 | A1  | 1/2014 | Hays et al. |
| 2014/0074793 | A1* | 3/2014 | Doering ................ G06F 16/113 707/667 |
| 2016/0026438 | A1* | 1/2016 | Wolfram ................ G06F 16/27 717/109 |
| 2016/0246850 | A1* | 8/2016 | Cosic ...................... G06F 16/21 |

FOREIGN PATENT DOCUMENTS

| CN | 105760511 A | 7/2016 |
| CN | 105824957 A | 8/2016 |

OTHER PUBLICATIONS

Written Opinion of the International Searching Authority dated May 2, 2017 for International Application No. PCT/CN2016/102124, 3 pages.

* cited by examiner

TASK PROCESSING METHOD AND DISTRIBUTED COMPUTING FRAMEWORK

CROSS-REFERENCE TO RELATED APPLICATIONS

This is a continuation of International Application PCT/CN2016/102124, with an international filing date of Oct. 14, 2016, which claims priority to Chinese Patent Application No. 201610873646.X, filed with the China National Intellectual Property Administration (CNIPA) on Sep. 30, 2016, the contents of each of which is incorporated herein by reference in its entirety.

TECHNICAL FIELD

The present disclosure relates to the field of computer, specifically relates to the field of distributed computing, and more specifically relates to a task processing method and a distributed computing framework.

BACKGROUND

In distributed computing, it is required to use logical plans to describe distributed computing tasks. Currently, in the existing distributed computing framework, the commonly used method for constructing a logical plan is to describe the upstream and downstream relationship of the operator.

However, when constructing the logical plan using the method, it is unable to describe the scope of data that the operator acts on. For example, distributed computing frameworks such as Apache Spark and Google CloudDataflow only support distributed datasets globally. After grouping a distributed dataset to obtain grouped data, the grouped data cannot be grouped again, resulting in that the constructed logical plan cannot describe requirements such as grouping data and then operating on the grouped data, which are often encountered in actual distributed computing.

SUMMARY

The present disclosure provides a task processing method and a distributed computing framework, to solve the technical problems mentioned in the Background section.

In a first aspect, the present disclosure provides a task processing method, including: parsing an expression corresponding to a distributed computing task, and constructing task description information corresponding to the distributed computing task, the task description information being used to describe a corresponding relationship between an operator and a distributed dataset, and the operator acting on at least one of the distributed dataset or distributed datasets obtained by grouping the distributed dataset; determining, based on the task description information, a distributed dataset the operator acting on; and performing distributed computing on the distributed dataset the operator acting on using the operator.

In a second aspect, the present disclosure provides a distributed computing framework, including: a construction unit, configured to parse an expression corresponding to a distributed computing task, and construct task description information corresponding to the distributed computing task, the task description information being used to describe a corresponding relationship between an operator and a distributed dataset, and the operator acting on at least one of the distributed dataset or distributed datasets obtained by grouping the distributed dataset; a determination unit, configured to determine, based on the task description information, a distributed dataset the operator acting on; and a computing unit, configured to perform distributed computing on the distributed dataset the operator acting on using the operator.

The task processing method and the distributed computing framework provided by the present disclosure construct task description information corresponding to a distributed computing task by parsing the expression corresponding to the distributed computing task, the task description information being used to describe a corresponding relationship between an operator and a distributed dataset, and the operator acting on at least one of the distributed dataset or distributed datasets obtained by grouping the distributed dataset, determine a distributed dataset the operator acting on based on the task description information, and perform distributed computing on the distributed dataset the operator acting on using the operator. In the distributed computing, the acting scope and nesting relationship of the operator is described by constructing a topology. The same operator may act on the distributed dataset and the distributed datasets obtained by grouping the distributed dataset at the same time, thereby describing distributed computing tasks having different computing needs.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
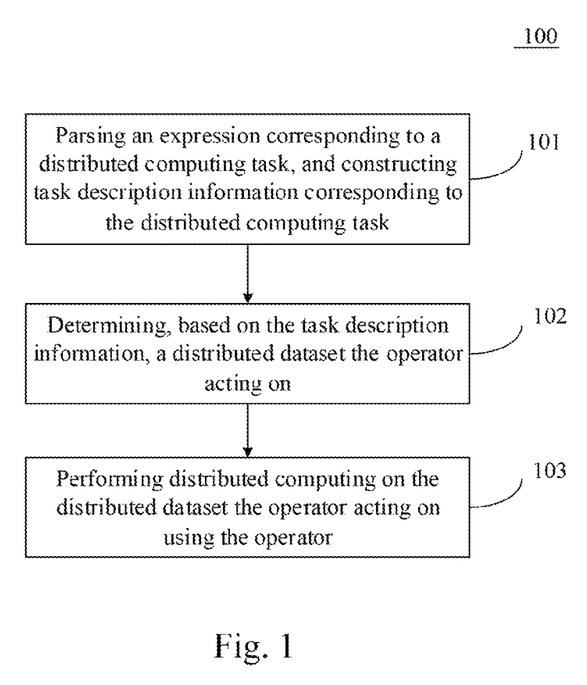
FIG. 1 is a flowchart of an embodiment of a task processing method according to the present disclosure.

With reference to FIG. 1, a flow 100 of an embodiment of a task processing method according to the present disclosure is illustrated. The method includes the following steps.

Step 101, parsing an expression corresponding to a distributed computing task, and constructing task description information corresponding to the distributed computing task.

In the present embodiment, the distributed computing task may be represented by an expression. The task description information may be used to describe the distributed computing task, and the task description information may be referred to as a logical plan. When processing the distributed computing task, the expression of the distributed computing task may be parsed and the logical plan corresponding to the distributed computing task may be constructed.

In the present embodiment, the logical plan of the distributed computing task may contain an operator and a domain in which the operator is located. The operator may represent an operation on the data. Taking score data of students in a school as an example, the operation of taking the top 3 scores of the students' score data may be referred to as the operator taking the top 3 scores of the students' score data. The domain may be used to represent the grouping of the data. The domain in which the operator is located may be used to determine the distributed dataset on which the operator acts. For example, if the domain in which the operator taking the top 3 scores of the students' score data is located is the grade domain, then the grade domain represents that a distributed dataset containing score data of all the students in the school is grouped by grade, and the distributed dataset on which the operator taking the top 3 scores of the students' score data acts is a distributed dataset containing the score data of the students of one grade obtained by grouping.

In the present embodiment, the logical plan may be defined in the following form:

```
Logical plan {
    Domain (single root)
}
Domain: {
    Parent node: empty | domain
    Child node: empty | [domain | operator]
}
Operator {
    Upstream: empty | [operator]
    Downstream: empty | [operator]
    Parent node: domain
}
```

In the present embodiment, the semantics of entering and leaving the domain may be defined. Entering a domain: start grouping the distributed dataset. To enter a domain, an operator configured to read a keyword in the expression for grouping the distributed dataset may first be accessed. To leave a domain, the distributed dataset is not further grouped. All distributed datasets generated by leaving the domain are merged together and flow into the next node.

Taking the distributed computing task of taking the top 3 scores by grade and the top 3 scores by class for the score data of the students as an example, the logical plan may be summarized as follows: First, there is a global domain, and the scope of the global domain is the scores of all the students. There is an input on the global domain. Grade information may be read from the input to generate a grade domain. The operator taking the top 3 scores may be placed in the grade domain to take the top 3 scores of the scores of the students for each grade. At the same time, in the grade domain, class information may then be read to generate a class domain. The operator taking the top 3 scores may be placed in the class domain to take the top 3 scores of the scores of the students for each class. Finally, the results of taking the top 3 scores twice may be outputted by the output operator located on the global domain.

In some alternative implementations of the present embodiment, the task description information is a topology, and the topology includes: an operator and a domain, and the domain is used to indicate a scope corresponding to a distributed dataset.

In the present embodiment, the task description information may be a topology. The topology may include an operator and a domain. The domain is used to represent grouping of data. The parent node of the domain is empty or a domain, and the child node of the domain is a domain or an operator.

In some alternative implementations of the present embodiment, the expression includes: a grouping operator keyword, a grouping keyword, and an operation operator keyword.

In the present embodiment, the expression corresponding to the distributed computing task includes: a grouping operator keyword, a grouping keyword, and an operation operator keyword.

In some alternative implementations of the present embodiment, the parsing an expression corresponding to a distributed computing task, and constructing task description information corresponding to the distributed computing task includes: creating a domain corresponding to the grouping keyword; determining an operation operator corresponding to the operation operator keyword; and constructing the topology. Child nodes of the domain in the topology include: a grouping operator corresponding to the grouping operator keyword and the operation operator.

The following is an example of an expression describing the distributed computing task of taking the top 3 scores by grade and the top 3 scores by class for the score data of the students, illustrating the process of parsing the expression corresponding to the distributed computing task.

When a grouping operator keyword (for example, GroupBy) and a grouping keyword indicating grouping by grade are present in the expression, the distributed dataset containing score data of all the students in the school may be determined to be grouped by grade based on the grouping keyword. When the expression contains an operation operator keyword corresponding to the operator taking the top 3 scores of the students' score data before the grouping keyword, the distributed dataset that the operator taking the top 3 scores of the students' score data acts on may be determined to be the distributed dataset containing score data of students of one grade obtained after the grouping, based on the operation operator keyword.

When a grouping operator keyword (for example, GroupBy) and a grouping keyword indicating grouping by class are present in the expression, the distributed dataset containing score data of students in one grade may be determined to be grouped by class based on the grouping keyword. When the expression contains an operation operator keyword corresponding to the operator taking the top 3 scores of the students' score data before the grouping keyword, the distributed dataset that the operator taking the top 3 scores of the students' score data acts on may be determined to be the distributed dataset containing score data of students of one class based on the operation operator keyword.

After determining the distributed dataset that the operator taking the top 3 scores of the students' score data acts on is respectively the score data of the students for each grade and the score data of the students for each class when parsing the expression of the distributed computing task, a topology for describing the distributed computing task for taking the top 3 scores by grade and the top 3 scores by class for the score data of the students may be constructed.

In this topology, a domain that represents the scope of the score data of the students being the score data of all the students in the school is included, i.e., the global domain. The child nodes of the domain may include an input node, an output node, and a domain representing the scope of the score data of the students being a grade, i.e., a grade domain. The distributed dataset containing the score data of all the students in the school may be inputted from the input node. The results obtained after taking the top 3 scores of the score data of the students in one grade and taking the top 3 scores of the score data of the students for the classes in one grade may be summarized and outputted from the output node.

In this topology, the child nodes of the domain representing the scope of the score data of the students being a grade include a grouping operator for reading grade information, an operation operator for taking the top 3 scores of the score data of the students, and a domain representing the scope of the score data of the students being a grade. The grouping operator is used to read the grade information from the input node, that is, the distributed dataset containing the score data of all the students in the school inputted from the input node is grouped according to grades to obtain distributed datasets containing score data of students for each grade. The operation operator for taking the top 3 scores of the score data of the students is used to take the top 3 scores of the score data of the students for each grade.

In this topology, the child nodes of the domain representing the scope of the score data of the students being a class include a grouping operator for reading class information, and an operation operator for taking the top 3 scores of the score data of the students. The grouping operator is used to read the class information, that is, the distributed dataset containing the score data of the students in one grade is grouped according to classes to obtain distributed datasets containing score data of students for each class. The operation operator for taking the top 3 scores of the score data of the students is used to take the top 3 scores of the score data of the students for each class.

Figure 2:
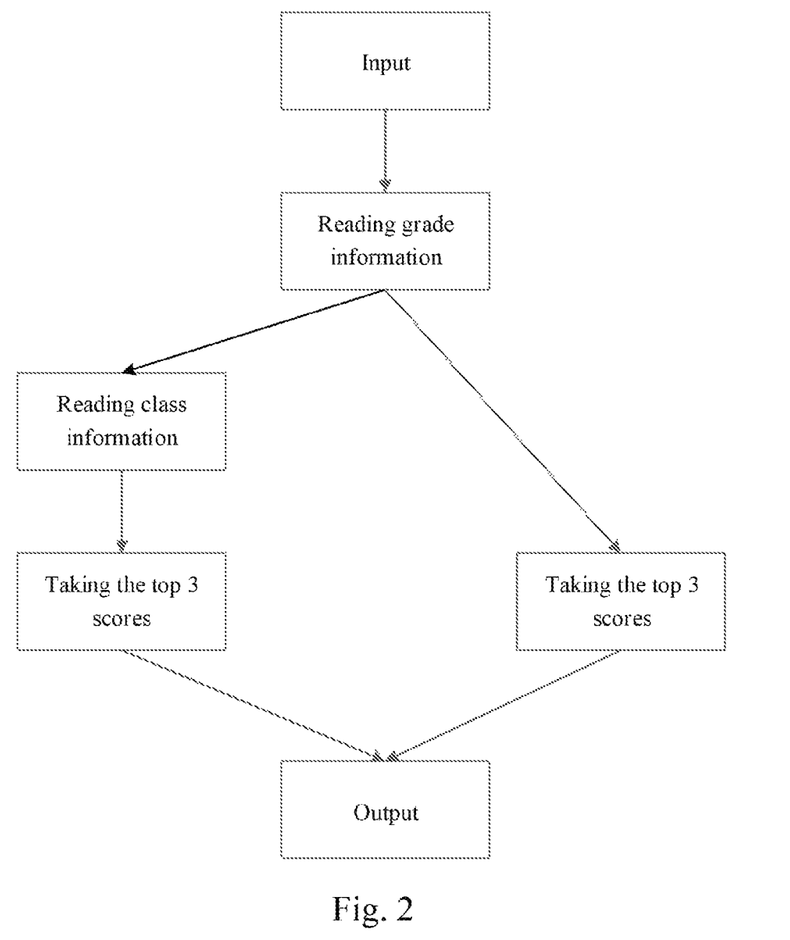
FIG. 2 is an exemplary effect diagram describing a distributed computing task using a DAG diagram.

With reference to FIG. 2, an exemplary effect diagram describing a distributed computing task using a DAG diagram is illustrated.

In FIG. 2, an input node, a reading grade information node, a reading class information node, taking the top 3 scores nodes, and an output node are shown. The operators represented by the nodes may form upstream and downstream relationships to form a DAG graph (Directed Acyclic Graph). The input node is an input operator for receiving an inputted distributed dataset containing score data of all the students in the school. The reading grade information node is a grouping operator for reading the grade information. The reading class information node is a grouping operator for reading the class information. The taking the top 3 scores nodes are respectively an operation node for taking the top 3 scores of the score data of the students for the grades and an operation node for taking the top 3 scores of the score data of the students for the classes. The output node is an output operator for outputting the results obtained after taking the top 3 scores of the score data of the students for the grades and of the score data of the students for the classes.

Figure 3:
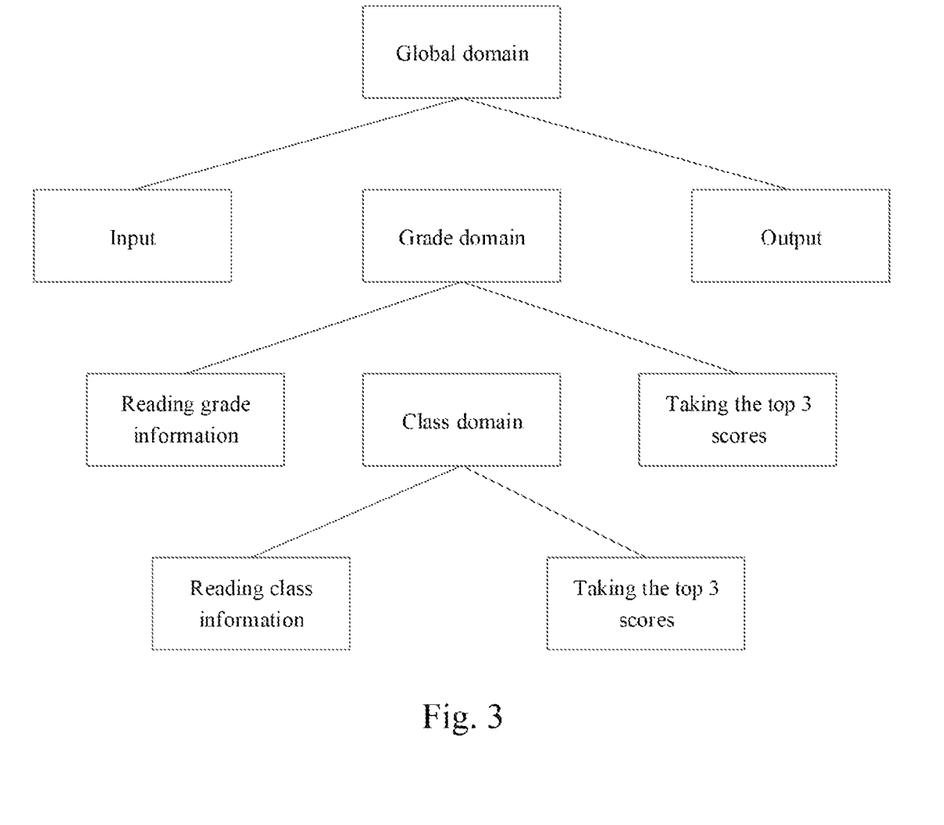
FIG. 3 is an exemplary effect diagram describing the distributed computing task in a tree structure.

With reference to FIG. 3, an exemplary effect diagram describing the distributed computing task in a tree structure is illustrated.

In FIG. 3, an input node, a reading grade information node, a reading class information node, taking the top 3 scores nodes, an output node, a global domain node, a grade domain node, and a class domain node are shown.

Child nodes of the global domain node contain the input node, the output node, and the grade domain node. The input node may be an input operator receiving the inputted distributed dataset containing the score data of the students. The output node may be an output operator outputting a calculation result obtained by performing distributed computing on the distributed dataset using the operator.

Child nodes of the grade domain contain the reading grade information node and a taking the top 3 scores node. The reading grade information node may be a grouping operator for reading the grade information, and the taking the top 3 scores node may be an operation operator for taking the top 3 scores of the score data of the students.

Child nodes of the class domain contain the reading class information node and a taking the top 3 scores node. The reading class information node may be a grouping operator for reading the class information, and the taking the top 3 scores node may be an operation operator for taking the top 3 scores of the score data of the students.

Figure 4:
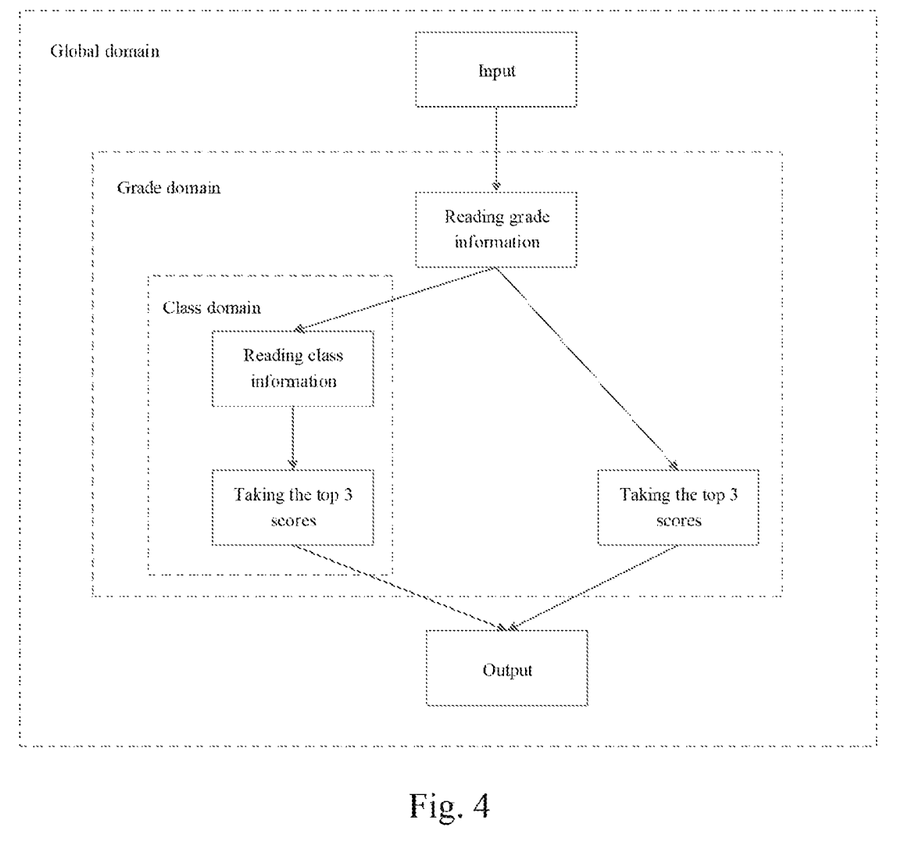
FIG. 4 is an exemplary effect diagram describing the distributed computing task using the tree structure and the DAG diagram.

With reference to FIG. 4, an exemplary effect diagram describing the distributed computing task using the tree structure and the DAG diagram is illustrated.

In FIG. 4, an input node, a reading grade information node, a reading class information node, taking the top 3 scores nodes and an output node represented by solid lines, a global domain node, a grade domain node and a class domain node represented by dotted lines are shown.

The input node may be an input operator receiving the inputted distributed dataset containing the score data of the students. The output node may be an output operator outputting a calculation result obtained by performing distributed computing on the distributed dataset using the operator.

The reading grade information node may be a grouping operator for reading the grade information, and the taking the top 3 scores node may be an operation operator for taking the top 3 scores of the score data of the students.

The reading class information node may be a grouping operator for reading the class information, and the taking the top 3 scores node may be an operation operator for taking the top 3 scores of the score data of the students.

The connection line between operators may be used to describe the upstream and downstream relationship of the operators, and the nesting between nodes may be used to describe the parent-child relationship.

Step 102, determining, based on the task description information, a distributed dataset the operator acting on.

In the present embodiment, after parsing the expression corresponding to the distributed computing task, and constructing task description information (such as a topology in step 101) corresponding to the distributed computing task, the distributed dataset the operator acting on may be determined based on the task description information.

Taking the distributed computing task of taking the top 3 scores by grade and taking the top 3 scores by class of the score data of the students as an example, the task description information (i.e., the topology) of the distributed computing task constructed in step 101 includes a root node (i.e., a global domain), an input node, an output node, a grade domain, a class domain node, and operation operators taking the top 3 scores of the score data of the students. The nodes in the topology may be traversed. During the traversal process, it is determined that the operation operators taking the top 3 scores of the score data of the students are respectively located in the grade domain and the class domain. Then, it is further determined that the distributed datasets that the operation operators taking the top 3 scores of the score data of the students act on are respectively the score data of the students for each grade and the score data of the students for each class.

Step 103, performing distributed computing on the distributed dataset the operator acting on using the operator.

In the present embodiment, after determining a distributed dataset the operator acting on based on the task description information in step 102, the distributed computing may be performed on the distributed dataset the operator acting on.

Taking the distributed computing task of taking the top 3 scores by grade and taking the top 3 scores by class of the score data of the students as an example, the distributed datasets that the operation operators taking the top 3 scores of the score data of the students act on are determined in step 102 to be the score data of the students for each grade and the score data of the students for each class respectively. The distributed computing may be performed on the score data of the students for each grade and the score data of the students for each class respectively, that is, taking the top 3 scores. Then, the result may be outputted by the output node in the global domain.

Figure 5:
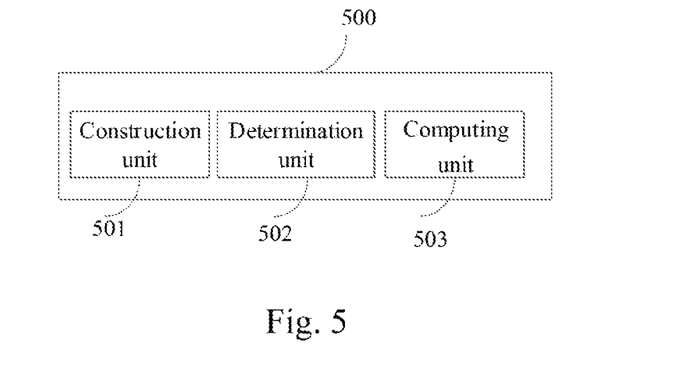
FIG. 5 is a structural schematic diagram of an embodiment of a distributed computing framework according to the present disclosure.

With reference to FIG. 5, as an implementation to the method shown in the above figures, the present disclosure provides an embodiment of a distributed computing framework. The apparatus embodiment corresponds to the method embodiment shown in FIG. 2.

As shown in FIG. 5, the distributed computing framework 500 of the present embodiment includes: a construction unit 501, a determination unit 502 and a computing unit 503. The construction unit 501 is configured to parse an expression corresponding to a distributed computing task, and construct task description information corresponding to the distributed computing task, the task description information being used to describe a corresponding relationship between an operator and a distributed dataset, and the operator acting on at least one of the distributed dataset or distributed datasets obtained by grouping the distributed dataset. The determination unit 502 is configured to determine, based on the task description information, a distributed dataset the operator acting on. The computing unit 503 is configured to perform distributed computing on the distributed dataset the operator acting on using the operator.

In some alternative implementations of the present embodiment, the expression includes: a grouping operator keyword, a grouping keyword, and an operation operator keyword.

In some alternative implementations of the present embodiment, the task description information is a topology, and the topology includes: an operator and a domain, and the domain is used to indicate a scope corresponding to a distributed dataset.

In some alternative implementations of the present embodiment, the construction unit 501 includes: a creating subunit (not shown), configured to create a domain corresponding to the grouping keyword; an operation operator determination subunit (not shown), configured to determine an operation operator corresponding to the operation operator keyword; and a topology construction subunit (not shown), configured to construct the topology, wherein child nodes of the domain in the topology include: a grouping operator corresponding to the grouping operator keyword, and the operation operator.

In some alternative implementations of the present embodiment, a child node of a root node of the topology includes: an output operator for outputting a calculation result obtained by performing distributed computing on the distributed dataset the operator acting on using the operator.

Figure 6:
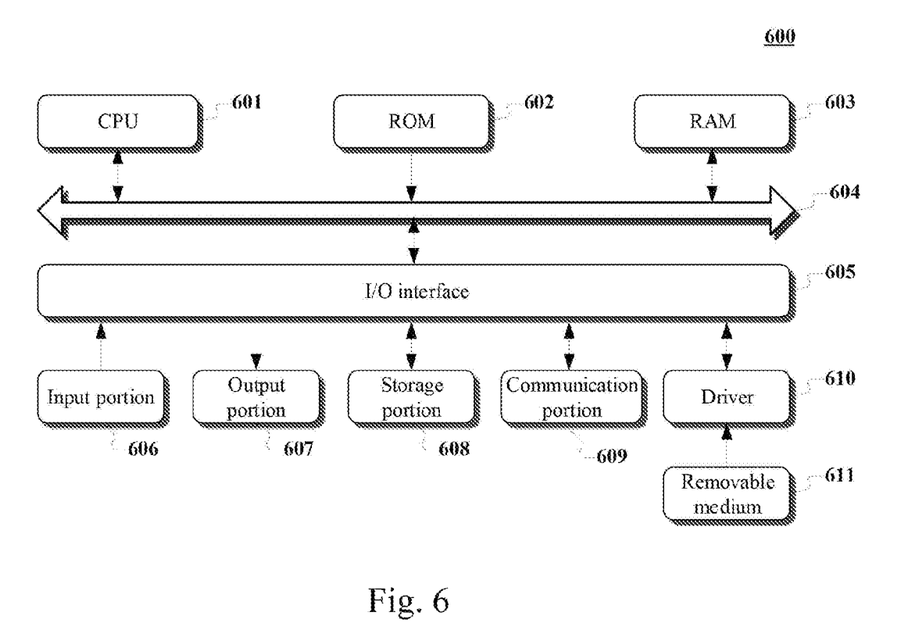
FIG. 6 is a structural schematic diagram of a computer system adapted to implement the distributed computing framework of embodiments of the present disclosure.

FIG. 6 illustrates a structural schematic diagram of a computer system 600 adapted to implement a distributed computing framework of embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

In another aspect, the present disclosure further provides a non-volatile computer storage medium. The non-volatile computer storage medium may be the non-volatile computer storage medium included in the device in the above described embodiments, or a stand-alone non-volatile computer storage medium not assembled into the device. The non-volatile computer storage medium stores one or more programs. The one or more programs, when executed by a device, cause the device to: parsing an expression corresponding to a distributed computing task, and constructing task description information corresponding to the distributed computing task, the task description information being used to describe a corresponding relationship between an operator and a distributed dataset, and the operator acting on at least one of the distributed dataset or distributed datasets obtained by grouping the distributed dataset; determining, based on the task description information, a distributed dataset the operator acting on; and performing distributed computing on the distributed dataset the operator acting on using the operator.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing a task, the method comprising:
    parsing an expression corresponding to a distributed computing task, the expression comprising a grouping operator keyword, a first and second grouping keywords, and an operation operator keyword, and constructing task description information corresponding to the distributed computing task, wherein the task description information is a topology in form of a directed acyclic graph (DAG) comprising identical operation operators and a first and second domains, the first domain being used to indicate dividing inputted data into groups according to the first grouping keyword to obtain a scope corresponding to a distributed dataset, and the second domain being used to indicate dividing the distributed dataset into sub-groups according to the second grouping keyword to obtain scopes corresponding to distributed sub-datasets, wherein the task description information in the form of DAG is used to describe corresponding relationships between operation operators and the distributed dataset and the distributed sub-datasets, and a first operation operator in the identical operation operators acts on the distributed dataset and a second operation operator in the identical operation operators acts on the distributed sub-datasets obtained by grouping the distributed dataset;
    determining, based on the task description information, the distributed dataset the first operation operator acting on and the distributed sub-datasets the second operation operator acting on; and
    performing distributed computing on the distributed dataset using the first operation operator and the distributed sub-datasets using the second operation operator, wherein the method is performed by at least one hardware processor.

2. The method according to claim 1, wherein the parsing an expression corresponding to a distributed computing task, and constructing task description information corresponding to the distributed computing task comprises:
    creating the first and second domains corresponding to the first and second grouping keywords;
    determining the identical operation operators corresponding to the operation operator keyword; and
    constructing the topology with the first domain as a child node of a global domain, wherein child nodes of the first domain in the topology comprise: a grouping operator corresponding to the grouping operator keyword, and the first operation operator in the identical operation operators.

3. The method according to claim 2, wherein a child node of a root node of the topology comprises: an output operator for outputting calculation results obtained by performing the distributed computing on the distributed dataset using the first operation operator and the distributed sub-datasets using the second operation operator.

4. The method according to claim 1, wherein the method further comprises generating the grouping operator keyword and the grouping keyword by splitting data into groups, applying a function to each group independently, and combining the results of the function to generate the grouping operator keyword and the grouping keyword.

5. The method according to claim 1, wherein the task description information in the form of DAG includes a global domain indicating a scope of the inputted data as a root node, wherein the first domain and an output operator are two child nodes of the root node, wherein the second domain and the first operation operator in the identical operators are two child nodes of the first domain, wherein the second operation operator in the identical operators is a child node of the second domain.

6. An apparatus for processing a task, the apparatus comprising:
    at least one processor; and
    a memory storing instructions, the instructions when executed by the at least one processor, cause the at least one processor to perform operations, the operations comprising:
    parsing an expression corresponding to a distributed computing task, the expression comprising a grouping operator keyword, a first and second grouping keywords, and an operation operator keyword, and constructing task description information corresponding to the distributed computing task, wherein the task description information is a topology in form of a directed acyclic graph (DAG) comprising identical operation operators and a first and second domains, the first domain being used to indicate dividing inputted data into groups according to the first grouping keyword to obtain a scope corresponding to a distributed dataset, and the second domain being used to indicate dividing the distributed dataset into sub-groups according to the second grouping keyword to obtain scopes corresponding to distributed sub-datasets, wherein the task description information in the form of DAG is used to describe corresponding relationships between operation operators and the distributed dataset and the distributed sub-datasets, and a first operation operator in the identical operation operators acts on the distributed dataset and a second operation operator in the identical operation operators acts on the distributed sub-datasets obtained by grouping the distributed dataset;

determining, based on the task description information, the distributed dataset the first operation operator acting on and the distributed sub-datasets the second operation operator acting on; and performing distributed computing on the distributed dataset using the first operation operator and the distributed sub-datasets using the second operation operator.

7. The apparatus according to claim 6, wherein the parsing an expression corresponding to a distributed computing task, and constructing task description information corresponding to the distributed computing task comprises:

creating the first and second domains corresponding to the first and second grouping keywords;

determining the identical operation operators corresponding to the operation operator keyword; and constructing the topology with the first domain as a child node, wherein child nodes of the first domain in the topology comprise: a grouping operator corresponding to the grouping operator keyword, and the first operation operator in the identical operation operators.

8. The apparatus according to claim 7, wherein a child node of a root node of the topology comprises: an output operator for outputting calculation results obtained by performing the distributed computing on the distributed dataset using the first operation operator and the distributed sub-datasets using the second operation operator.

9. A non-transitory computer storage medium storing a computer program, the computer program when executed by one or more processors, causes the one or more processors to perform operations, the operations comprising:

parsing an expression corresponding to a distributed computing task, the expression comprising a grouping operator keyword, a first and second grouping keywords, and an operation operator keyword, and constructing task description information corresponding to the distributed computing task, wherein the task description information is a topology in form of a directed acyclic graph (DAG) comprising identical operation operators and a first and second domains, the first domain being used to indicate dividing inputted data into groups according to the first grouping keyword to obtain a scope corresponding to a distributed dataset, and the second domain being used to indicate dividing the distributed dataset into sub-groups according to the second grouping keyword to obtain scopes corresponding to distributed sub-datasets, wherein the task description information in the form of DAG is used to describe corresponding relationships between operation operators and the distributed dataset and the distributed sub-datasets, and a first operation operator in the identical operation operators acts on the distributed dataset and a second operation operator in the identical operation operators acts on the distributed sub-datasets obtained by grouping the distributed dataset;

determining, based on the task description information, distributed dataset the first operation operator acting on and the distributed sub-datasets the second operation operator acting on; and performing distributed computing on the distributed dataset using the first operation operator and the distributed sub-datasets using the second operation operator.

10. The method according to claim 1, wherein the grouping operator keyword is used to group the data.

11. The method according to claim 10, wherein the operation operator keyword is used to process the grouped data.

12. The method according to claim 11, wherein the grouping keyword corresponds to a domain.

\* \* \* \* \*